(12) United States Patent
Kaltsukis

(10) Patent No.: US 8,868,028 B1
(45) Date of Patent: Oct. 21, 2014

(54) NETWORK SERVER EMERGENCY INFORMATION ACCESSING METHOD

(76) Inventor: Calvin L. Kaltsukis, San Rafael, CA (US)

( * ) Notice: Subject to any disclaimer, the term of this patent is extended or adjusted under 35 U.S.C. 154(b) by 498 days.

(21) Appl. No.: 13/374,257

(22) Filed: Dec. 19, 2011

Related U.S. Application Data

(63) Continuation-in-part of application No. 12/319,759, filed on Jan. 12, 2009, now Pat. No. 8,116,723.

(60) Provisional application No. 61/011,405, filed on Jan. 17, 2008.

(51) Int. Cl.
*H04M 11/04* (2006.01)

(52) U.S. Cl.
USPC ..................... 455/404.2; 455/404.1

(58) Field of Classification Search
USPC ......................... 455/403, 404.1, 404.2, 422.1, 455/456.1–456.6; 379/37–51
See application file for complete search history.

(56) References Cited

U.S. PATENT DOCUMENTS

| | | | |
|---|---|---|---|
| 5,815,550 A | 9/1998 | Miller | |
| 5,896,565 A | 4/1999 | Miller | |
| 6,154,658 A | 11/2000 | Caci | |
| 6,225,944 B1 | 5/2001 | Hayes | |
| 6,430,174 B1 | 8/2002 | Jennings | |
| 6,532,360 B1 | 3/2003 | Shaffer | |
| 6,563,910 B2 | 5/2003 | Menard | |
| 6,807,564 B1 | 10/2004 | Zellner | |
| 7,323,973 B1 | 1/2008 | Ceglia | |
| 7,937,066 B2 | 5/2011 | Kaltsukis | |
| 8,116,723 B2 | 2/2012 | Kaltsukis | |
| 8,311,547 B2* | 11/2012 | Hilden et al. | 455/446 |
| 2001/0028711 A1* | 10/2001 | Antonucci et al. | 379/245 |
| 2004/0184584 A1* | 9/2004 | McCalmont et al. | 379/45 |
| 2006/0234727 A1 | 10/2006 | Ashley et al. | |
| 2007/0211692 A1* | 9/2007 | Boroski et al. | 370/351 |
| 2007/0286160 A1 | 12/2007 | Gorti et al. | |
| 2009/0177730 A1 | 7/2009 | Annamalai et al. | |
| 2010/0046489 A1 | 2/2010 | Dickinson et al. | |
| 2010/0060514 A1* | 3/2010 | Wang et al. | 342/357.1 |
| 2010/0257250 A1 | 10/2010 | Salafia et al. | |
| 2010/0261492 A1 | 10/2010 | Salafia et al. | |
| 2010/0317317 A1 | 12/2010 | Maier et al. | |
| 2011/0013541 A1 | 1/2011 | Croy et al. | |
| 2011/0019664 A1 | 1/2011 | Dickinson et al. | |
| 2011/0065416 A1* | 3/2011 | Burt et al. | 455/404.2 |
| 2012/0157795 A1* | 6/2012 | Chiu et al. | 600/301 |
| 2013/0259030 A1* | 10/2013 | DeWeese | 370/352 |

* cited by examiner

*Primary Examiner* — Ajit Patel
(74) *Attorney, Agent, or Firm* — Norman E. Lehrer

(57) ABSTRACT

Methods are disclosed for using an Internet server with access to a data base of PSAP (Public Safety Answering Point) jurisdiction boundaries and telephone numbers to track the location of a wireless communication device and to determine a PSAP telephone number to call to request emergency services at the location of said wireless communication device using telephone company provided location information. Methods are disclosed for establishing conference call connections between a person, a PSAP and a remote wireless communication device. Also disclosed are methods for establishing an Explicit Call Transfer call connection that redirects a call from a person to a wireless communication device to the telephone of a PSAP having jurisdiction over the location of said remote wireless communication device. Alzheimer tracking devices, offender monitoring devices, medical alert notification devices, satellite tracking devices and child safety telephone embodiments of the current invention are also disclosed.

31 Claims, 7 Drawing Sheets

NETWORK SERVER EMERGENCY INFORMATION ACCESSING METHOD

CROSS-REFERENCE TO RELATED APPLICATIONS

This application is a Continuation-in-Part of prior U.S. patent application Ser. No. 12/319,759, entitled "Network Server Emergency Information Accessing Method" filed Jan. 12, 2009 now U.S. Pat. No. 8,116,723, which claims the benefit of priority of U.S. Provisional Patent Application No. 61/011,405 filed Jan. 17, 2008. The contents of these applications are hereby incorporated by reference in their entireties.

FIELD OF INVENTION

The present invention is related to methods and apparatus to provide a means whereby a wireless communication device can be tracked by an Internet server using location information collected by a telephone company network and provided by the telephone company network to the Internet server to track the location of the wireless communication device and to query a data base of PSAP jurisdiction boundaries and telephone numbers to determine the correct PSAP telephone number to call to request emergency services at the location of the wireless communication device.

A telephone company network knows the telephone number of every communication device connected to each of its cell towers and the geographic latitude and longitude location of every cell tower on its network. The telephone company network also knows the telephone number of a PSAP having jurisdiction over the location of every cell tower on its network.

The United States is currently in the process of changing the E-911 telephone system to an NG-911 (Next Generation) IP based Internet telephone system. The term PSAP telephone number used in the present invention should be understood to include the 3-digit 911 telephone number and 7 and 10 digit administrative telephone numbers used in present E-911 systems as well as IP based telephone addresses and telephone numbers that will be used in future NG-911 public safety IP based telephone systems.

A preferred embodiment of the present invention uses location information collected by a telephone company network and provided to an Internet server by the telephone company network to track the location of a wireless communication device and to query a data base of PSAP jurisdiction boundaries and telephone number to determine the correct 10-digit PSAP telephone number for a person to call to request emergency services at the location of the wireless communication device being tracked.

A person wishing to determine the telephone number of a PSAP with jurisdiction over the location of a wireless communication device being tracked by the Internet server can access the Internet server, view the location of the device and the published data base provided telephone number of a PSAP with jurisdiction over the location of the device, call the published data base provided PSAP telephone number, establish a call connection with the PSAP call taker and request emergency services at the location of the device being tracked.

The person can verbally provide the location of the device to the PSAP call taker or he can provide the Internet address of the Internet server so that the PSAP call taker can access the Internet server and view the location of the device being tracked independently of the person. The person can also establish a 3-party conference call connection between the telephone of the person, the telephone of the PSAP and the wireless communication device allowing the PSAP call taker to transmit a location query to the wireless communication device and to receive a return transmission from the wireless communication device that includes the latitude and longitude location of the wireless communication device. The person can also provide the telephone number of the wireless communication device to the PSAP call taker and the PSAP call taker can call the device in either a 2-party call connection or a 3-party conference call connection. If a call connection authorization code is required by the device to establish a call connection with an incoming PSAP call the person can first transmits a command to the wireless communication device instruction it to disable its call screening security feature and auto-answer any incoming call for a predetermined length of time so that the PSAP call will be auto-answered. The command disabling security call screening can be transmitted as a DTMF command during a call connection by the person or it can be transmitted as a text, data e-mail or SMS message by the person to the wireless communication device.

If the wireless communication device has been ordered to auto-answer an incoming PSAP call by the person the PSAP call taker can establish a call connection and transmit a location query to the wireless communication device during the established call connection which the wireless communication device is programmed to answer by transmitting its current latitude and longitude geographic location back to the PSAP call taker. The location query and the return location information from the device can be formatted in text, data, machine synthesized audio voice, recorded audio voice, RTT (Real-Time Text), DTMF (Dual tone Multi Frequency) or TTY (Text Telephone for the Deaf) compatible format. however the preferred embodiment is to use DTMF (Dual Tone Multi Frequency) dial tones for the location query and machine synthesized audio voice or Tele-type text (TTY-TDD) for the latitude and longitude information transmitted from the device to the PSAP call taker. The latitude and longitude information can be collected by a location sensor such as a GPS receiver or by a wireless communication device using WiFi based location detection means such as is used in the iPhone.

DESCRIPTION OF PRIOR ART

Both wired and wireless type telephone safety, security and tracking systems stand to benefit from the improvements of the present invention. In addition to a pure cellular phone system (i.e., one with a plurality of cell sites distributed on land), satellite phone call connection is another option for mobile communication as is Voice over Internet Protocol (VoIP) connections. Accordingly, the present invention applies equally to cellular, satellite and internet call connections.

Although wireless telephones and wireless communication telematics devices can be important public safety tools, they also present unique challenges for public safety and emergency response personnel. For example, a wireless telephone is mobile, and therefore is not associated with any one fixed location or address. Thus, a caller using a wireless telephone may be calling from anywhere. The U.S. E9-1-1 and European eCall systems have established one number Universal Emergency Call Numbers such as 911 and 112 that have Automatic Number Identification (ANI) and limited Automatic Location Information (ALI) capabilities. The problem with current E9-1-1 call location technology is that it has very limited usefulness when the real-time location of a fast moving mobile object, such as a vehicle, needs to be tracked. In the U.S. when an emergency call is received by a 911 PSAP the FCC has mandated that the telephone service provider is required to include the location from which the call originates. Phase 1 ALI (Automatic Location Information) is capable of sending a rough location of the call origin location by sending the PSAP the location of the cell tower receiving the call. Phase 2 ALI is capable of more accurate location information by using GPS information from a cellular telephone or triangulation of multiple cellular access stations, however, this ALI information that is automatically sent to the PSAP is currently only a one time location notification at the beginning of the 911 call that shows a rough location from where the call was dialed and that does not automatically update to show where it might have moved to during the call.

If the emergency PSAP call taker wishes to update the location of a moving wireless telephone he has to request an ALI update from the service provider. This position update has to be processed by multiple system servers, and sometimes a third-party service provider, and then transmitted to the requesting PSAP. This process can take up to half a minute, and sometimes even longer. Sometimes Phase 2 ALI information isn't even supported by the service provider that is putting the call through in the specific location from which the call originates and Phase 1 ALI, which is not accurate enough for reliable moving vehicle tracking, is all that is received by the PSAP. Another shortcoming of the present system is that only the PSAP dispatcher with the proper communications/computer equipment has access to this location information.

A stolen vehicle tracking and recovery call from a wireless cellular or satellite telephone in a vehicle requires that the dispatcher notify a patrol officer and then attempt to vector the responding officer in on the vehicle location. The problem with this is that the location showing on the dispatcher's location monitoring equipment is not real-time and could easily be minutes out of date. A vehicle traveling at high speed in a metropolitan area could easily be miles away from the location provided to the officer responding to the call which would mean that the dispatcher would have to keep updating his location information and redirecting the responding officer until the officer and the stolen vehicle eventually arrived at the same location at the same time. This is a time consuming process and also very resource intensive. A PSAP has a limited number of dispatchers to handle large numbers of calls. They prefer to handle a call as quickly as possible and then move on to the next call. Tying up a PSAP dispatcher to relay location information in a stolen vehicle recover call is not how they prefer to use their resources. It would therefore be desirable to provide a means and method that would allow the dispatcher to hand-off the call to a responding officer as quickly as possible so that he/she could return to handling other emergency calls.

It would also be desirable to provide a method allowing a responding officer to access an Internet server displaying real-time mapped location information of wireless communication devices independently of the dispatcher after notification by the dispatcher of a need to do so and reception of the log-on information (i.e., Domain name or IP address and any needed pass-code) required to gain access to the information that is available on the server. The server would preferably be configured to display the location of the wireless communication device both in mapped and also in street name and building number address format. The present invention provides a means and method to accomplish this.

It would also be desirable to provide a method allowing the person requesting emergency services to establish a conference call connection between the communication device, the PSAP and his telephone so that the PSAP can transmit a location query to the wireless communication device and receive a return transmission from the communication device showing its current latitude and longitude location. The person could also provide the telephone number of the wireless communication device to the PSAP call taker so that the call taker, or any emergency responder the PSAP call taker chose to share the device telephone number with, could call the device and establish a call connection; transmit a location query and receive a return transmission including the latitude and longitude of the device independently of the person. For security reasons it is desirable to program the wireless communication device to only auto-answer incoming calls from preapproved caller ID telephone numbers or to require input of a security code or PIN number before allowing a call connection to be established and a location query accepted. This security caller authorization feature would need to be disabled by the person, for a predetermined length of time, so that a PSAP call would be auto-answered or any required PIN security number or security code be provided to the PSAP call taker along with the device telephone number so the PSAP could establish a call connection, transmit a location query and receive a return location transmission from the wireless communication device.

Accordingly, there exists today a need for a method and system for an Internet Server Emergency Information Accessing Method that helps ameliorate the above-mentioned difficulties while also providing other substantial benefits and improvements to safety, security and tracking systems. Clearly, such a system would be useful and desirable.

DESCRIPTION OF PRIOR ART

Alarm, tracking and ACN systems are, in general, known. For example, the following patents describe various types of these devices:

U.S. Pat. No. 6,532,360 to Shaffer, Mar. 11, 2003;
U.S. Pat. No. 5,896,565 to Miller, Apr. 20, 1999
U.S. Pat. No. 5,815,550 to Miller, Sep. 29 1998
U.S. Pat. No. 6,225,944 to Hayes, May 1, 2001
U.S. Pat. No. 7,323,973 to Ceglia, Jan. 29, 2008
U.S. Pat. No. 6,154,658 to Caci, Nov. 28, 2000
U.S. Pat. No. 6,430,174 to Jennings, Aug. 6, 2002
U.S. Pat. No. 6,807,564 to Zellner, Oct. 19, 2004
U.S. Pat. No. 6,563,910 to Menard Feb. 26, 2001
U.S. Pat. No. 7,937,066 to Kaltsukis Dec. 14, 2004

While the structural arrangements of the above described methods and devices may, at first appearance, have similarities with the present invention, they differ in material respects. These differences are essential for the effective use of the present invention and which admit of the advantages that are not available with prior art.

OBJECTIVES AND ADVANTAGES

The wireless telephone of the present invention can be programmed to accept an incoming SMS, MMS, or data command to call a remote person; or it can be programmed to auto-answer an incoming call from a remote person and accept a command to establish a conference call connection including a person, a PSAP and a wireless telephone. Or it can be programmed to establish a data connection with a network server and a multiparty call connection with a PSAP; or it can be programmed to not auto-answer the incoming call but to place a return call to the telephone number of the calling phone at termination of the incoming call attempt. The wireless telephone can also be programmed to accept an SMS command from a person or a data command from a network server to place an outgoing call to the telephone number of a person and to then establish a multiparty call with a PSAP upon reception of a command from the person during the established call connection ordering the wireless telephone to establish the multiparty call. The person commanding establishment of the multiparty call can be a care giver, an asset owner, a person designated by an owner, a private non-police call center or a fleet command center dispatcher.

The wireless telephone or wireless communication telematics device of the present invention can also be configured to transmit video information captured by a connected camera to any call recipient during any call connection using IMS/SIP video call protocols such as AT&T now offers subscribers with their newly established Video Share service. Including video image information in a PSAP call would be particularly valuable in automatically generated ACN calls in vehicle crash notification situations because it would provide the dispatcher with a means to actually see the injury level of vehicle occupants upon reception of an ACN call. By also transmitting this video to the server via the network server data connection dispatched emergency responders are also able to log-onto the server and view occupant injury levels even after termination of the original PSAP call. Crash data can also be included to the camera captured image information using video text overlay format with text crash data and location information superimposed over the video.

The wireless telephone of the present invention can be programmed to establish a data connection with a network server when ordered to set-up a multiparty call, and to send location data to the server, and to maintain the data connection for a predetermined period of time after the multiparty call is terminated. This location data can be used by the server to determine the location of the wireless telephone, to generate maps showing this location; and to determine the correct 10-digit telephone number to call (if a 911 type number is not supported) to connect to a PSAP having jurisdiction over the location from which the call is originating using a database of PSAP numbers linked to areas of PSAP jurisdiction.

If the database shows that a 911 type numbers is supported it would preferably be the default number called. If the database shows that 911 type numbers are not supported for this location then a 10-digit administrative PSAP telephone number would be sent by the server to the wireless telephone and used by the wireless telephone as the PSAP number to call. It is very important that the PSAP not be connected to a voice mail account should the called person not answer the incoming call. To guard against this the wireless telephone should be programmed to request a voice or DTMF input from the person by voicing a recorded or processor generated message to the person before completing the multiparty call connection. For example: "to call 911 please speak or press the number 5." If it does not receive the requested voice or DTMF response it times out and terminates the call without completing the multiparty call connection.

Establishment of the multiparty call allows the person to talk directly to the PSAP call taker, explain the reason for the call and provide log-on information (Domain name or IP address and any required pass-code) that allows the dispatcher to access the server and view real-time mapped location, speed and direction of travel information transmitted from the wireless telephone to the server. This information can also be accessed by any auxiliary emergency responder to whom the dispatcher chooses to furnish the server log-on information. The server would preferably also provide street name and lot number address corresponding to the mapped location. Auxiliary responders can access this information while the multiparty call is active and also for a predetermined period of time after the multiparty call is terminated using any computer with an Internet connection or by means of any Internet capable cell phone with a web browser. VoIP type bridged communications through the server with persons in the vicinity of the wireless telephone would preferably be supported and able to be established through the server by the PSAP or by any auxiliary responders with whom the PSAP has shared the log-on information.

The conference call connection also allows a PSAP call taker to transmit a location query to the remote communication device or telephone and to receive a return transmission containing the current GPS latitude and longitude location of the wireless communication device or telephone.

The server should also be configured to allow a logged-on person to send remote control commands to the wireless telephone that activate or deactivate functions and/or devices connected to the wireless telephone such as turning on a camera, unlocking doors, turning off a vehicle engine and establishing VoIP type communications connections with persons in the vicinity of the wireless telephone.

Personal user information can also be stored on the server by authorized users that could prove useful to emergency responders. For example: Registered vehicle owner name, address and contact information, emergency contact numbers for next of kin, medical history of users and vehicle identification information such as VIN number, license plate number, make, model, year and vehicle color, etc.

Although many countries have established One Number Universal Emergency Call Numbers (911 in the U.S., 112 in the EU) there are still many countries lacking a single Universal Emergency Call Number. It is therefore desirable that the server include a Geo-location database of 10-digit Administrative PSAP telephone numbers linked to the GPS locations over which each PSAP has jurisdiction. The wireless telephone and Internet server of the present invention can easily be configured so that both automatic vehicle crash detection (ACN) calls and received commands to call 911 will trigger a data transmission from the wireless telephone to the server that includes the GPS location from which the emergency call is originating. The server can then access a look-up table of PSAP 10-digit Administrative phone numbers linked to GPS areas of jurisdiction, determine the correct PSAP phone number to call based on the location of the crash; and then transmit this phone number to the wireless telephone to be used to dial and connect to the proper PSAP to handle the call.

If both a Universal Emergency Number such as 911 and also a 10-digit Administrative number are available the preferred embodiment is to use the 911 type number. Some countries including Canada, however, have laws limiting machine generated ACN calls being directly dialed to 911 type emergency numbers and if the wireless telephone is in such a jurisdiction the server can be programmed to determine this and use the 10-digit administrative number instead of the 911 type number to conform to local laws and regulations.

It is also possible that the person ordering the multiparty PSAP call might simply prefer to use an Administrative number rather than the 911 type number. The present invention allows the person in charge of the server set-up configuration for each device to select which number to use.

Another embodiment of the Invention for using the database of 10-digit PSAP numbers in stolen asset tracking and recover situations is for a person to access the network server and send a command to the wireless telephone through the server ordering it to begin transmitting location information to the server. The person could then secure the 10-digit Administrative telephone number of the PSAP with jurisdiction over the location and use this Administrative number to place a standard 2-party PSTN or VoIP call to this PSAP. The server can also be configured as a call switchboard so that it is able to make a PSTN or VoIP call to this 10-digit number and bridge the person to server audio communications into the established PSAP call so that he/she is then able to explain to the PSAP the reason for the call and provide log-on information for the server.

The ability to establish a call to a PSAP through the server would also prove beneficial for event notifications originating from areas that do not support PSTN or cellular communications, such as from a ship at sea, where the data connection to the server is established using a satellite communications link and notification of detection of a predefined event and the location of the event is sent to the server. In this case a person would receive a text alert, phone call, email, SMS or MMS event notification from the server, the person could connect to the server and cause the server to set up a call connection with a data base provided 10-digit PSAP telephone number. This call bridge connection established by the server, which can be VoIP for both calls or VoIP and PSTN bridged together, allows the person to speak to an emergency services answering point, in this case most likely a navy or coast guard response center. The person can also transmit a location query to a communication device operation on a Satellite network which query the device will answer by transmitting it current GPS latitude and longitude location to the server.

Both cellular telephones and wireless telematics type safety/security devices require access to the cellular telephone network but wireless telephone type telematics devices are often not allowed to have 10-digit telephone numbers assigned to them by some cellular service providers because they are consider emergency telephone type devices and not communications devices and therefore pay lower monthly service fees for cellular service than do cell phones. Lacking 10-digit telephone numbers telematics type devices cannot receive incoming telephone calls but they can make outgoing emergency calls and set up multiparty call connections when commanded to do so. These telematics type devices are usually assigned a unique access number by the service provider that can either change with each usage or not change once assigned depending on the method the company providing cellular connection services chooses to implement.

Cellular air time M2M reseller Jasper Wireless does not assign 10-digit telephone numbers to devices operating on its networks; therefore a PSAP receiving a call using their network will not be provided with a call-back telephone number allowing call reconnection should the call be dropped also a person cannot call the device directly and have it auto-answer the call or send it an SMS or e-mail message addressed to a telephone number. Any SMS or email commands sent to the wireless telephone would need to be routed through the network service provider and then sent to the unique access number assigned to the device by the service provider. Another way to command the wireless telephone to call a person, so that the multiparty call can be ordered, is to send a data type command to the wireless telephone through the network server ordering establishment of the call.

A preferred embodiment of the current invention is therefore to employ SMS, email or data transmissions to order telephones lacking assigned phone numbers to place an outbound voice call to the telephone number of a person so that the person can answer this call and then command the calling wireless telephone to establish a multiparty call with a PSAP by input of DTMF tones on the key pad of his telephone.

To avoid the person missing the incoming call and the call going to voice mail, and the PSAP being connected to a voicemail account instead of the person; it is very important that any PSAP multiparty call not be completed without some type of input from the person during the first call connection—preferably a DTMF or voice input if the wireless telephone supports voice recognition. For example the wireless telephone could be programmed to voice: "To call 911 please say or press the number 5." If this input is not received by the wireless telephone it should be programmed to time-out and end the call connection without calling the PSAP and establishing the multiparty call connection.

For security reasons a security pass-code should be required to access the server and this pass-code only be allowed by the server at establishment of a multiparty or ACN call to a PSAP; and then only for a predetermined length of time after termination of the multiparty call. If no PSAP call was ordered any person trying to access the server using this telephone number as a pass-code would be denied access. This is needed to insure that authorities can only track a person's location when he authorizes it. This pass-code can be any combination of letters and numbers; however, the preferred embodiment is to use the telephone number of the wireless telephone if one is assigned.

If the service provider does not allow a call-in capable telephone number then a unique identifying number can be permanently assigned to the wireless telephone by the service provider or the provider can generate a random pass-code number for each multiparty PSAP call event. This pass-code can be provided to the PSAP verbally by the person during the multiparty call, automatically voiced by the wireless telephone as recorded or processor generated audio; or voiced by the wireless telephone if either the person or the PSAP transmits a predetermined DTMF tone(s) during the call (for example the digit 9). The pass-code can also be automatically transmitted to the PSAP at the beginning of the call in TTY/TDD or as text, MMS, IM, RTT or in video text overlay format if 3G IMS/SIP communications protocols are supported by the wireless telephone, the service provider and the PSAP.

If a higher level of security is required a second user selected pass-code can also be required by the server before allowing access and this user selected pass-code changed by the user any time he chooses to do so. This second pass-code would be in addition to the telephone number or random number assigned by the service provider and would be required or not required at the option of the owner or authorized user and known only to him.

In the preferred embodiment of the present invention before a PSAP or emergency responder could access the server and view location information he/she would need to be informed, during a multiparty or ACN call, that emergency services were needed and that event specific information was available at a network server such as www.911track.com; and that the security pass-code(s) to access this information was the telephone caller ID number of the wireless telephone or a different provider assigned access number.

For wireless telephones operating on network provider systems that do not allow incoming calls to be answered, a preferred embodiment is for the remote person to access the network server and enter commands that results in the server sending data type commands to the wireless telephone ordering it to call the person. An alternative embodiment is for the person to send the wireless telephone an SMS command to call him. The remote person then answers this incoming call, the wireless telephone voices a request for a DTMF input (for example the digit 5) from the person to complete the multiparty call; the person transmits the DTMF tone and the multiparty call is established. If the person does not input the requested DTMF tone(s) the wireless telephone assumes that the call went to voice mail and terminates the call. Voice input can be used instead of DTMF detection if the wireless telephone supports voice recognition. For example the wireless telephone can be configured to voice a request for an input from the person such as: "Please enter or speak the number 5 to continue."

Many web sites allow a caller to establish calls by bridging calls through them and allow Spoofing caller ID information—making calls appear as though they are from a number that does not belong to the caller phone. If caller ID Spoofing and unauthorized access is a concern with security phones programmed to auto-answer incoming calls the phone can be configured to not auto-answer an incoming call but to make a call-back call to the telephone caller ID number of the incoming call. This high security method insures that even if someone managed to send a fake caller ID number to the wireless telephone only an authorized person would receive the return call.

Remote control commands can also be transmitted to the wireless telephone as SMS, MMS, e-mail or network server generated data commands. For example, a person could access the server and click on selection buttons on the server web page to send data commands to the wireless telephone causing it to activate/deactivate devices connected to the telephone or enable/disable functions the wireless telephone is programmed to perform. DTMF tones can also be transmitted to the telephone during any voice call connection to remotely control devices connected to the wireless telephone as well as select functions the telephone is programmed to support such as a voiced menu of options with the DTMF input needed to select each option.

Another embodiment, although not the preferred embodiment, of the present invention that can also be used to provide a way for a remote person to place a call to a wireless telephone and be automatically connected to a PSAP 911 type number is by means of a Call Transfer type telephone connection. Call Transfer is a Supplementary System Service provided by the telephone company to subscribers that allow a call to be redirected from one telephone number to another target telephone number automatically. Using Call Transfer a person can set up the wireless telephone so that incoming calls are automatically redirected to another predetermined telephone number (in this case a 911 type number) by the telephone service provider call-switching system. In the present invention SMS text messages from a person and/or data commands from a server can be used to toggle Call Transfer services on and off as can DTMF command inputs during a voice call. This allows the system to be remotely configured to auto-answer an incoming call or to transfer an incoming call directly to a 911 type number depending on which option a person chooses to enable/disable at any given time.

EMBODIMENTS OF THE INVENTION

The present invention can be embodied in many different ways to provide desirable benefits for many different usages. The preferred embodiment of the Invention is in motor vehicle applications to provide a means and method for tracking the location of a moving stolen vehicle and for ACN accident detection and notification purposes. Another embodiment is for tracking a communication device carried by or connected to a wandering Alzheimer patient. Other embodiments will be obvious to one skilled in the art from the descriptions and specifications; these should not be construed as limiting the scope of the Invention but as merely providing illustrations of some of the presently preferred embodiments of the invention. A few of the many different possible embodiments are as follows:

Automatic Crash Notification Embodiment of Invention

The present invention will prove beneficial when used in vehicle Automatic Crash Notification (ACN) situations to automatically notify a PSAP of a vehicle crash event. In a vehicle crash situation the crash victim would most probably not know the exact location of his/her whereabouts. In some situations the caller may be unconscious or severely injured and not able to provide location information. The preferred embodiment of the present invention overcomes these limitations by connected crash detection sensors detecting a crash event and the wireless telephone automatically establishing both a telephone ACN call notification to a 911 type PSAP number and another concurrent data connection to a network server. The data connection allowing crash related data such as GPS location, collision speed, delta-V, number of vehicle occupants belted and unbelted and also transmission of video information showing the injury level of the vehicle passengers and audio from connect microphones to be transmitted from the wireless telephone to the server. The voice call connection with the PSAP allowing the PSAP call taker to be provided with a recorded voice or TTY/TDD event notification. If IMS/SIP protocol is supported IM and/or processor generated text in video format can be sent. The notification further including server log-on information required by the PSAP to access the server and the crash data transmitted to it by the wireless telephone. Establishment of the PSAP voice call would preferably also open a speaker-phone type connection allowing the dispatcher to speak with the vehicle occupants and ask them if they require emergency services.

If both the PSAP and the wireless telephone support 3G IMS/SIP protocols video information can also be transmitted to the PSAP during the voice call allowing the PSAP to view the injury level of the vehicle occupants; and crash data could also be added to the image information in video text overlay format. Video text is generated as picture type image information by a microprocessor which means that a 3G cell phone could transmit text information in video format with the video information created by processors instead of being captured by a camera and that crash data could be sent directly to a PSAP as processor generated video text information. This crash data, in video text format, could be added to camera captured video information or transmitted in a video call as stand-alone text image information formatted crash data.

Dispatched emergency responders in possession of the server log-on information would be able to access the server, view crash data, establish VoIP type communications with vehicle occupants, view maps showing the vehicle location; and view image information captured by cameras connected to the wireless telephone showing the injury level of the vehicle occupants. The image information can be transmitted in photograph, JPEG or Streaming Video format. Any streaming video formats could be used however MPEG4 and/or H.264 formats are the currently preferred embodiments.

A European study [Wavecom Bluepaper—January 2007] has concluded that "an eCall system that relays the accurate location of the accident to the PSAP and the emergency services will allow a reduction of response time to the accident of about 50% in rural areas and up to 40% in urban areas." When crash related data is also made available to responders' additional time is saved by insuring that the proper police, fire and medical equipment is quickly dispatched to the accident scene. The preset invention provides both the location information and crash data required to enable these reductions in response times.

Detection of ACN events, such as an airbag inflation, or detection of a collision by sensor, such as accelerometers, G-force or acoustical pick up devices or detection of vibrations of deforming metal, or vehicle occupants initiating ACN calls by a voice dialing sequence (as in Ford Sync "Call 911") or by a button press (as in the OnStar system) are all supported in the present Invention. If desired the wireless telephone can be programmed to send a first ACN call to a call center, fleet dispatcher or other designated person instead of to a 911 type PSAP number, and the call center can then order the wireless telephone to setup a multiparty call connection with a 911 type PSAP number and also a data connection with the server.

The UK (England) has set up an eCall ACN system that differs from that of most of Europe and all of North America in that the UK has adopted a two level SMS and voice call PSAP system. This UK emergency call method was introduced in 1937 when the General Post Office was the monopolistic telecommunications provider. The 999 service resulted from a tragic incident at a Doctor's surgery in London where a fire occurred that resulted in five deaths. The Fire Service response was delayed because at the time there was no prioritization of emergency calls, the operator having effectively placed the call on hold in a queue.

In the UK an emergency call (e-call) can be established when an SOS button in the car is pushed, or the airbag control module detects a deployed airbag, an SMS message is then sent. The message contains information on location, vehicle identity, message type (e.g. "Automatic SOS") etc. The information is complemented with vehicle and owner information and transmitted to the operator. Vehicle location and an explanatory text are displayed on the map of the PSAP telematics workstation. After the SMS has been transmitted, a voice call is established to the operator who will assist with professional services.

The basic emergency call handling process in the UK is: the call is answered by the Emergency Call Handling Agent (the Level 1 PSAP—either British Telecom, Cable and Wireless, KComm, or Global Crossing) who then connects the call on to the appropriate emergency authority (Level 2 PSAP) in respect of both function (Police, Ambulance, Fire or Coastguard) and geographical area. To comply with the UK's eCall ACN call handling procedure, as defined by the Telematics Protocol, the voice call from the vehicle must be routed directly to the level 1 PSAP whilst the data set [SMS] is routed via a third party service provider before being delivered to the same PSAP.

Mobile network operators for the rest of Europe (other than the UK) favor a technology called in-band modem for eCall crash data transmission. There are a number of potential in-band modem solutions, one of which is a proprietary technology invented by a U.S. inventor named Michael J. Ceglia (U.S. Pat. No. 7,323,973) that uses TTY/TDD (which all U.S. PSAPs' are required by FCC mandate to support); another is from a US company called Airbiquity. Airbiquity modems are used extensively as part of GM's OnStar telematics service in North America but it has not been used to date in Europe. An ETSI working party has recommended adoption of in-band modem as the European standard. This will, however, require equipping all PSAPs' with the necessary new communications equipment to support this proprietary technology—which will undoubtedly be very expensive. The adoption of the present invention's server based ACN crash data and video of occupant injury levels; dynamic mapping of fast moving mobile objects and personal information data base capabilities would prove a beneficial and inexpensive solution to any eCall system mandated by the EU without requiring any PSAP to acquire expensive new equipment.

The present invention improves upon the UK and EU systems by providing a means whereby emergency responders can access crash date and other event related information and establish communications through a network server with vehicle occupants independent of the PSAP. The UK is expected to eventually upgrade its telephone system to be compatibility with 3G IMS/SIP standards which means that video calls and MMS video clip ACN alerts will then be supported for eCall ACN notifications. When MMS is supported eCall ACN alert messages will allow inclusion of video information captured by cameras in the vehicle that shows the injury level of vehicle occupants and voice calls will allow video information to be added to the voice call thereby providing a significant improvement over the present UK SMS text and voice only system. In addition when used for stolen asset tracking and recovery the ability to access the server's real-time mapping of moving assets by dispatched police personnel will prove very beneficial.

The network server of the present invention changes the GPS location information the wireless telephone is sending it into mapped location images and also street name, building number, address information. If desired the server can be programmed to transmit these map images and addresses back to the wireless telephone for retransmission to the PSAP during a voice call using 3G IMS/SIP image transmission protocols. Video and text and map information can then also be included in MMS messages for the UK system. Image information from a connected camera(s) could be transmitted by the wireless telephone directly to the PSAP during both ACN and multiparty call connections using 3G IMS/SIP video-share calling protocols such as is currently supported by AT&T in the U.S. on their 3G capable networks. Crash data could also be sent as text information during voice calls; and video text overlay ACN crash and location data can also be included if desired.

Explicit Call Transfer Embodiment of the Invention

Another embodiment of the present invention that allows a person to establish a call connection with a PSAP having jurisdiction over the location of a remote wireless communication device is for the person to establish a first call connection with the remote wireless communication device and then transmit a command to the wireless communication device ordering it to transmit a predetermined dialing sequence to the telephone company network that is predetermined to notify the telephone company network that an Explicit Call Transfer call connection between the telephone of the remote person and the telephone of a PSAP having jurisdiction over the location of the wireless communication device is requested. The telephone company network will then redirect the call from the person to the telephone number of a PSAP with jurisdiction over the location of the cell tower the wireless communication device is connected to the telephone company network through and the wireless communication device will be disconnected from both the person and the PSAP call connections.

The wireless communication device would preferably be programmed to auto-answer any call from any telephone number for a predetermined length of time when an Explicit Call Transfer was established. This would allow either the person or the PSAP to call the telephone number of the wireless device to establish a 3-party conference call connection including the person, the PSAP and the wireless communication device. The PSAP could also call the device in a 2-party connection and be able to transmit a location query and receive a return transmission from the device showing its current GPS latitude and longitude location if the PSAP desired to access the device independently of the person.

The established conference call connection and the 2-party call connection both would allow the PSAP call taker to transmit a location query to the wireless communication device which the wireless communication device is programmed to answer by transmitting its current GPS latitude and longitude location to the PSAP call taker. The location query can be in data, text, DTMF or TTY compatible format and the GPS latitude and longitude location transmitted to the PSAP by the wireless communication device can be in data, text, machine generated audio or TTY compatible format. However, the preferred embodiment is to use DTMF for the location query and to use machine generated audio to voice the GPS latitude and longitude location information to the PSAP call taker.

Satellite Tracking with Internet Serve Mapping and 10-Digit PSAP Number Data Base Embodiment of Invention Ships at sea and persons or assets in remote wilderness areas where no telephone service is supported would benefit from the present invention sending event notifications to a network server by means of satellite communications systems. Satellite data event notifications can be sent to a network server and the server can use this data to create maps showing the location from which the notification originated and the type of event detected. The server can also be configured to cause an SMS, MMS or e-mail notifications to be sent to designated persons notifying the persons of reception of the event notification. A person could then access the server, view the received data, and if desired, instruct the server to transmit a data command to the communications device instructing it to carry out a predefined function such as transmitting location information at timed intervals (for example every 5 minutes) until commanded to stop. The server could also be configured to place a notification phone call, either PSTN or VoIP, to the person and the person could cause the server to call a PSAP, either PSTN or VoIP, and bridge the person to server connection to the server to PSAP connection allowing the person to talk with the PSAP call taker.

It would also be desirable for a person to be able to transmit a location query to a satellite communication device through the Internet server which the remote satellite communication device would answer by transmitting its current GPS latitude and longitude location to the Internet server. The Internet server would preferably be programmed to use this latitude and longitude location information to map the current location of the satellite communication device and to query a data base of PSAP jurisdiction boundaries and telephone number to determine the telephone number of a PSAP having jurisdiction over the location of the satellite communication device. This PSAP telephone number would be published on the Internet server for viewing by a person accessing the Internet server and used by the person to call the data base provided PSAP telephone number and request emergency services at the location of the satellite communication device. Satellite type wireless communications devices can be bi-direction (transmit and receive) or transmit only. Bi-direction devices cost more than transmit only devices in monthly subscriber fees and data and voice service costs more than data only service. If one-way data transmission of event notifications is all that is required to implement an intended usage then this embodiment of the present invention should be used. If both voice and data bi-directional operation is required then this embodiment should be used. All possible combinations of transmit/receive and data/voice embodiments should be understood to be covered by the present invention.

Satellite event notification and tracking of assets such as tractor-trailers, HAZMAT shipments, construction and farm equipment, shipping containers and railroad assets and aircraft would prove beneficial for areas lacking cellular network coverage as would ACN notifications for vehicles. The wireless telephone would preferably be dual-mode cellular and Satellite and configured to use cheaper cellular services when available and to switch to more expensive Satellite networks only when cellular service in not supported. The Satellite networks could support data only, or voice and data; or video, voice and data communications depending on the capabilities of the Satellite network and the wishes of the subscriber.

The network server receiving satellite event notifications would preferably be set up to support a world-wide data base of emergency services PSAP administrative 10-digit phone numbers linked to areas of jurisdiction of each PSAP to determine the correct PSAP to call having jurisdiction over the location from which the notification originates—which could be in a foreign country or a location at sea and hundreds of miles from land. The person could then place a call to this administrative 10-digit phone number using his personal telephone or through the network server with the server acting as a call bridge; and inform the answering call taker that an emergency notification has been received and provide the IP address or Domain name and pass-code needed to access the server. The emergency services call taker could then log-onto the server and view mapped location information and other event specific data being transmitted to the server from the satellite communications device and take appropriate action to deal with the emergency situation.

Security Alarm System Embodiment of Invention

The present invention will also prove beneficial with security alarm systems protecting homes, businesses and fixed location assets. A preferred embodiment for such an implementation of the present invention is to deploy a dual voice and data communications device at the location of the property to be protected. The communications security device would upon detection of predefined events, by connected sensors, transmit a voice call, SMS or MMS notification to a person advising said person of detection of said event and also send event specific data to a network server. The server would preferably be configured to notify preselected persons of reception of event notifications. The person could then establish an IP data connection with the network server and access the event specific data from the security device that would preferably including audio and video information as well as other predefined information the security device was programmed to collect and send to the server.

The security communications device would most probably be protecting a non-mobile asset such as a home or business connected to the Internet by a broad band wireline connection. It is therefore desirable to support both wireline and wireless data connections so that if one is defeated the device can still use the other to transmit event detection notifications. If desired a private security company, government anti-terrorist or military unit could receive the event notification if the asset protected required this level of protection. For locations lacking both cellular and wireline internet connection a satellite telephone connection could be employed.

Upon reception of an event notification the person receiving the notification could log-onto the server, access the information transmitted from the security device; and upon reaching a determination that police intervention was required, send a data command through the server to the security device instructing it to call his telephone number, or if the security device had a telephone number assigned to it, the person could place a call to the telephone number of the wireless security device. The device could be programmed to auto answer this incoming call or to place a return call to the caller ID number of the unanswered call and once a call connection was established accept a command from the person to establish a multiparty call with a 911 type P SAP number.

Another embodiment of the present invention that allows a person to connect with a PSAP with jurisdiction over the location of the security device is to have the server establish the call connection using an Interconnected VoIP call (VoIP services that use the Public Switched Telephone Network (PSTN), including wireless networks, to originate and terminate calls). VoIP calls are linked to an IP address instead of a location. Because of this, the FCC mandated in 2005 that VoIP service providers offer information on the location and identity of the caller through enhanced 911. E911 systems automatically provide to emergency service personnel a 911 caller's call back number and location information. To meet the E911 requirements most VoIP providers currently require users to register the location of their calling devices and the provider uses this registered location to determine the proper PSAP to receive the 911 call. This means that if the security device of this embodiment is permanently located in a fixed location, such as a home or business, this registered location can be used by the server to establishing VoIP calls between a logged on person and a PSAP with jurisdiction over the registered location of the security device. In this embodiment the server would preferably be configure to act as a VoIP switchboard to call a PSAP by command of the person and bridge in the person so that the person can then talk with the PSAP call taker.

Whichever method, PSTN or VoIP, is used to connect the person with the PSAP the person is able to tell the dispatcher the reason for the call and provide the log-on information required to gain access to the data being transmitted to the server by the security device. This data would preferably include audio and video information captured by microphones and cameras connected to the security device. The PSAP could then dispatch police officers to deal with the emergency event and furnish these officers with the log-on information needed to access the server and gain access to the video and audio information transmitted from the security device using any Internet capable computer or browser capable cell phone. Once logged-on the dispatched officer(s) would be able to send remote control commands through the server to the security device instructing it to pan/tilt/zoom the camera, unlock doors, turn on lights etc. Maps and floor plans of the protected property could also be stored on the server and accessed by the officer(s) responding to the emergency event as well as contact information for property owners.

Modern cell phones such as the iPhone are capable of both PSTN and VoIP wireless internet and WiFi calls through a router connected to a broadband wireline or wireless Internet network server. Dual-mode cellular and satellite mobile telephones are also available and many insurance companies insist that alarm systems protecting high value assets such as banks and jewelry stores be dual-mode, wired and wireless, so that if a bad guy cut the phone lines the alarm system would switch into cellular or satellite mode and still be able to send an event notification.

An additional embodiment of the present invention when used in a fixed location security system situation is therefore to support both wired and wireless event notification connections. Event notifications can be sent as a voice call with recorded message, SMS, MMS or e-mails to the person or as data to a server which would then automatically notify designated persons. MMS alerts and voice call connections can be established with the telephone of the person by the security device and have video information included showing the actual event that triggered the alert notification by using 3G cellular systems supporting IMS/SIP protocols. If VoIP is used by the server to established the PSAP call a 3-party VoIP call including the person, the security device and the PSAP can be set up by the server with video from a camera connected to the security device transmitted to the PSAP and the person during the call.

Personal Safety Wireless Telephone Embodiment of Invention

Modem cell phones are location aware by virtue of having GPS chipsets built into them and/or using known locations of WiFi hotspots and cell tower IDs. 3G cellular telephones are capable of simultaneous voice calls and internet data connections as well as being capable of sending and receiving SMS, MMS, IM and e-mails which means that the present invention can very easily be implemented in firmware/software cell phone programs to turn a standard type cell phone into a location tracking safety telephone. Such a cell phone software/firmware embodiment of the current invention would have significant value when used to provide emergency assistance to distressed persons such as lost children, Alzheimer patients, lone workers, persons at high risk of kidnapping and for security guard supervision and location monitoring. Some European countries have already mandated that lone workers be provided with communications means to request help in the event of emergency situations. It is expected that many more countries will eventually also make this a requirement.

A possible embodiment of the present invention for this application would be to program special software/firmware programs into a cell phone used by the person to be protected. A parent, guardian or supervisor could then send an SMS or data command to the cell phone causing it to covertly place a call to the person and also open a data connection with a network server and begin transmitting location information to the server without any audio or visual indications by the phone itself that could alert a bad guy that the phone had been activated in security mode.

The parent, guardian or supervisor, would then answer the incoming call from the safety phone and send a DTMF command to the safety phone that causes it to open a microphone type connection allowing the remote person to listen in on any audio occurrences taking place in the vicinity of the safety phone. The remote person could also send a predefined DTMF command that would cause the safety phone to open a 2-way speaker-phone type audio connection allowing the remote person to talk with the person in possession of the safety phone in intercom mode.

If the remote person determined that police emergency services were required he/she could send a predetermined DTMF command to the safety phone ordering it to establish a multiparty call connection with a 911 PSAP number. When the PSAP call taker answered the call the person could explain the nature of the emergency and provide the log-on information for the network server allowing access to the server so that the PSAP dispatcher, or any dispatched officers the dispatcher chooses to share the log-on information with, could log-onto the server using any interne connected computer or browser capable cell phone and gain access to the mapped location data being transmitted to the server by the safety phone. The PSAP call taker could also transmit a location query to the telephone which the telephone would answer by transmitting its current GPS latitude and longitude back to the PSAP call taker.

The log-on pass-code to access the server would preferably be the telephone number assigned to the safety phone. For security reasons log-on using this pass-code phone number would only be allowed by the server subsequent to the safety phone being ordered to establish the multiparty PSAP connection and then only for a specific period of time after termination of the PSAP connection. (For example 2 hours.)

The PSAP could dispatch officers and provide them with the log-on information for the server. Once logged-onto the server the responding officer(s) could establish communications with the safety phone with the server acting as a VoIP call bridge and enabling communications with the child, Alzheimer patient or person in possession of the phone. The officers, having access to the server real-time mapped location information showing the location of the safety phone, would thereby be provided with a means for determining the location of the safety phone and quickly arriving at the location of the person requiring assistance.

Medical Event Notification Embodiment of Invention

An additional embodiment of the present invention that would also prove beneficial would be when used in connection with medical event sensors connected to the cell phone of a person via short range radio frequency connections, such as Bluetooth, Zigbee or WiFi, and programmed to cause the cell phone to send emergency alert notifications to predetermined care givers upon detection of predetermined events by the medical sensors. A medical event, such as a heart attack would be detected by the medical sensor and cause a call to be made, or an SMS or e-mail sent, to a predetermined care giver. The care giver would then establish a telephone connection by answering the incoming call, sending a "call me" SMS or by accessing the server and sending a command for the phone to call him/her. He/she would then answer the incoming call from the wireless telephone and converse with the distressed person—if the person was able.

If the care giver reached a determination that emergency services were required he/she could enter a predetermined DTMF command ordering the cell phone to set up a multiparty call to a PSAP. The care giver could then explain the nature of the emergency to the PSAP call taker and provide the log-on information for the server receiving data from the wireless telephone and the PSAP could dispatcher emergency response personnel to provide emergency services to the distressed person. The PSAP or care giver could also transmit a predetermined DTMF command to the cell phone which the cell phone would respond to by voicing it current GPS latitude and longitude to the PSAP and person via the established conference call connection.

At establishment of the multiparty call the cell phone would establish a data connection with a server and begin sending GPS location data to the server. The server would preferably assign the telephone number of the cell phone as the log-on pass-code to access this location information. If desired VoIP type audio can also be sent to the server via the established data connection. The PSAP would be provided with the caller ID phone number of the distressed person during the multiparty call connection or if a non-telephone number was required to log-onto the server the care giver would provide this log-on pass-code number and the IP, Domain name address of the server. The PSAP would share this number with dispatched emergency service responders allowing them to access the server and view maps showing the location of the distressed person even after the multiparty PSAP call was terminated. An established VoIP connection between the wireless phone and server would allow the server to bridge in the logged-on responders thereby allowing them to talk to the distressed person. For countries lacking 911 type numbers the server could look up the 10-digit phone number for a PSAP with jurisdiction at establishment of the data connection and send this number to the cell phone to use in dialing the PSAP Public Safety Offender Monitoring Embodiment of Invention House arrest and offender monitoring devices such as ankle bracelets will also benefit by the multiparty call and simultaneous data connection to a server of the present invention. Modem cell phones' with GPS capabilities are currently available that are the size of a wrist watch and can easily be configured into an offender tracking device. For this application a preferred embodiment would be to configure such a cell phone chip-set as an ankle bracelet and program it to periodically send GPS location data to a mapping program running on a network server. The server would be configured so that Geo-Fence boundaries can be set by a parole officer or supervisor that the offender is not allowed to exit or not allowed to enter.

Violation of a boundary would cause the server to send a data, SMS or e-mail alert to a supervisor notifying him/her of a violation of a location boundary. The supervisor could then access the server and determine the location of the monitored offender and if official action is required the supervisor could send an SMS, e-mail or data command to the ankle bracelet ordering it to place a telephone call to his telephone. The supervisor would answer the incoming call and send a predetermined DTMF tone to the ankle bracelet ordering it to establish a multiparty call with a 911 type PSAP phone number. When the PSAP answers the call the supervisor can explain the reason for the call and provide the server log-on information and pass-code required to access the server maps showing the offender's location and the dispatcher could dispatch officers to pick up the offender. The important thing about the 3-way 911 multiparty call is that no matter where the offender is anywhere in the United States, Canada or Mexico (which all use the 911 PSAP number) the correct PSAP having jurisdiction over that locality will be the PSAP that receives the call from the wireless telephone.

The ankle bracelet can be designed with a small microphone built into it and a Bluetooth or other type of short range radio frequency connection to an earpiece, offender personal cell phone or other accessory audio input/output device. This would allow a supervisor to place a standard type voice call to the ankle bracelet that would be auto-answered, and open a microphone connection for 1-way audio surveillance allowing the supervisor to monitor audio in the vicinity of the offender. The supervisor could also send an SMS or server data command to the ankle bracelet ordering it to call his telephone number.

Biosensors are currently available that detect alcohol and illegal drug usage as well as body readings indicative of intoxication, anger or extreme exertion. Such sensors could be built into the ankle bracelet and upon detection of predetermined conditions cause the cell phone to send a data, SMS or e-mail notification to the supervisor alerting him/her to begin more closely monitoring the offender. The supervisor could log-onto the server, view offender location, and establish audio surveillance of the offender to ensure that he is not involved in a prohibited act.

The ankle bracelet can also be designed so that the batteries of the cell phone can be recharged using recently developed energy harvesting technologies. Movement, body heat and RF emissions from power lines and cell towers can now be harvested by special pick-up and conversion devices and converted into electricity that can then be used to recharge the batteries of a cell phone. The Epoq EGP-WP88 wrist watch cell phone which charges using kinetic recharging as you move your arms while walking is one example of such an energy harvesting device.

u-blox AG, a Swiss company has developed GPS receiver technology, the LEA4R, with built-in dead reckoning using accelerometers and gyro compasses, such as are found in game controllers and modem cell phones such as the iPhone that ensures location determination even when GPS signals are blocked. The ankle bracelet would preferably be designed to include such a dead reckoning capability and internal memory medium so that if GPS lock or cellular coverage was interrupted time-stamped speed, acceleration and heading information would be logged into memory for later transmission to the server when cellular and GPS coverage was again available.

The server would be programmed to use this data to extrapolate GPS positions using mathematical algorithms to fill in offender locations during the time periods when location data was not sent to the server by the cell phone. This would keep an offender from using a cell phone jamming device to defeat the cellular/GPS connections or simply wrapping tin foil around it to block reception and transmissions of cellular and GPS radio signals and thereby becoming invisible to the tracking server long enough to go somewhere and do something he wasn't supposed to be doing because as soon as he turned the jammer off, or removed the tinfoil shielding, he would become visible again to the server and the time-stamped data logged into memory would be transmitted to the server. Any missing tracking locations would then be determined and logged into the tracking record and any boundary violations by the offender discovered.

The server would preferably be configured to keep location information for at least a 30 day period for each offender under supervision so that if an authorized person, such as a detective investigating a crime, entered a time/date/location the server would output a list of all supervised offenders' who were near this location on that date and at that time. This information could then be used by the detective to focus his attention on offenders' who need to be checked out or to eliminate offenders who were not near the location at the time of the crime and can therefore be eliminated as suspects.

BRIEF DESCRIPTION OF THE DRAWINGS

For the purpose of illustrating the invention, there are shown in the accompanying drawings forms that are presently preferred; it being understood that the invention is not intended to be limited to the precise arrangements and instrumentalities shown.

DRAWING REFERENCE NUMBERS AND LETTERS

Reference Letters

Figure 1:
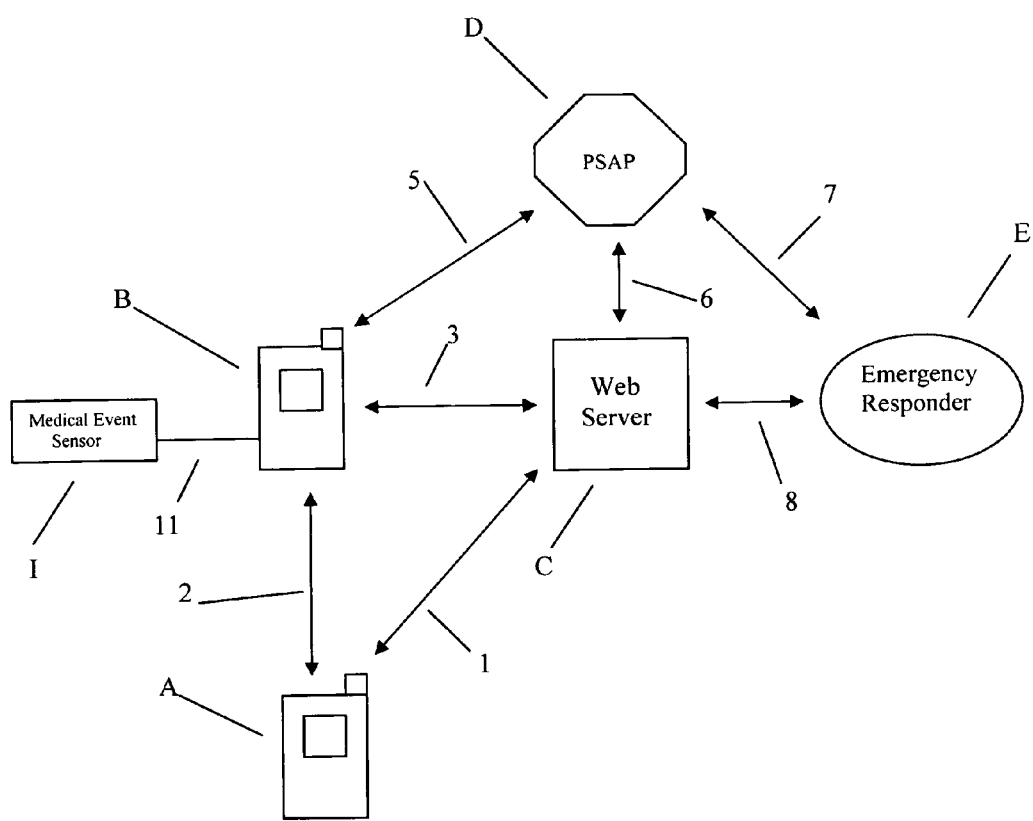
FIG. 1 is a schematic representation of a personal safety wireless telephone embodiment of the invention.
Figure 2:
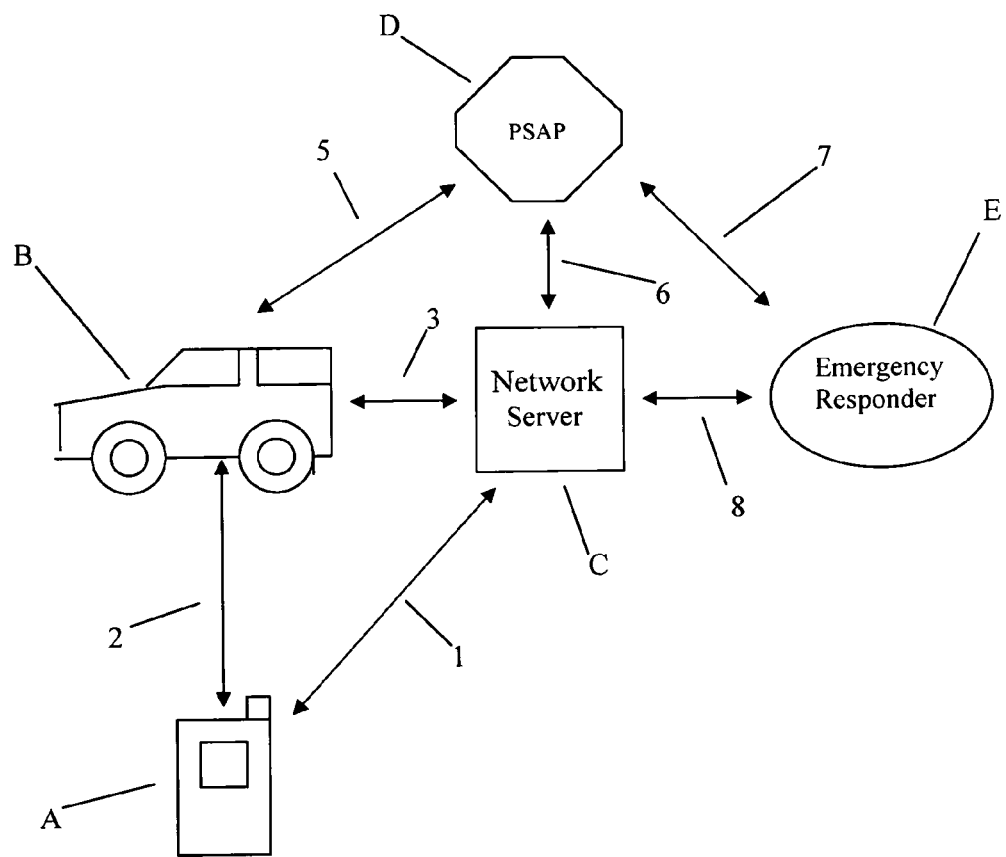
FIG. 2 is a schematic representation of an asset tracking and recovery embodiment of the invention.
Figure 3:
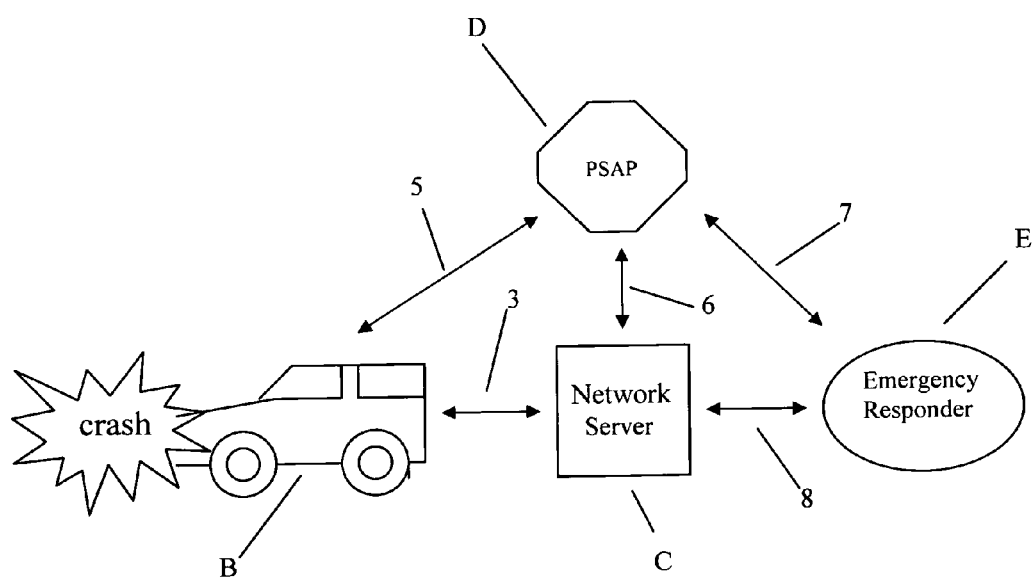
FIG. 3 is a schematic representation of an automatic crash notification embodiment of the invention.
Figure 4:
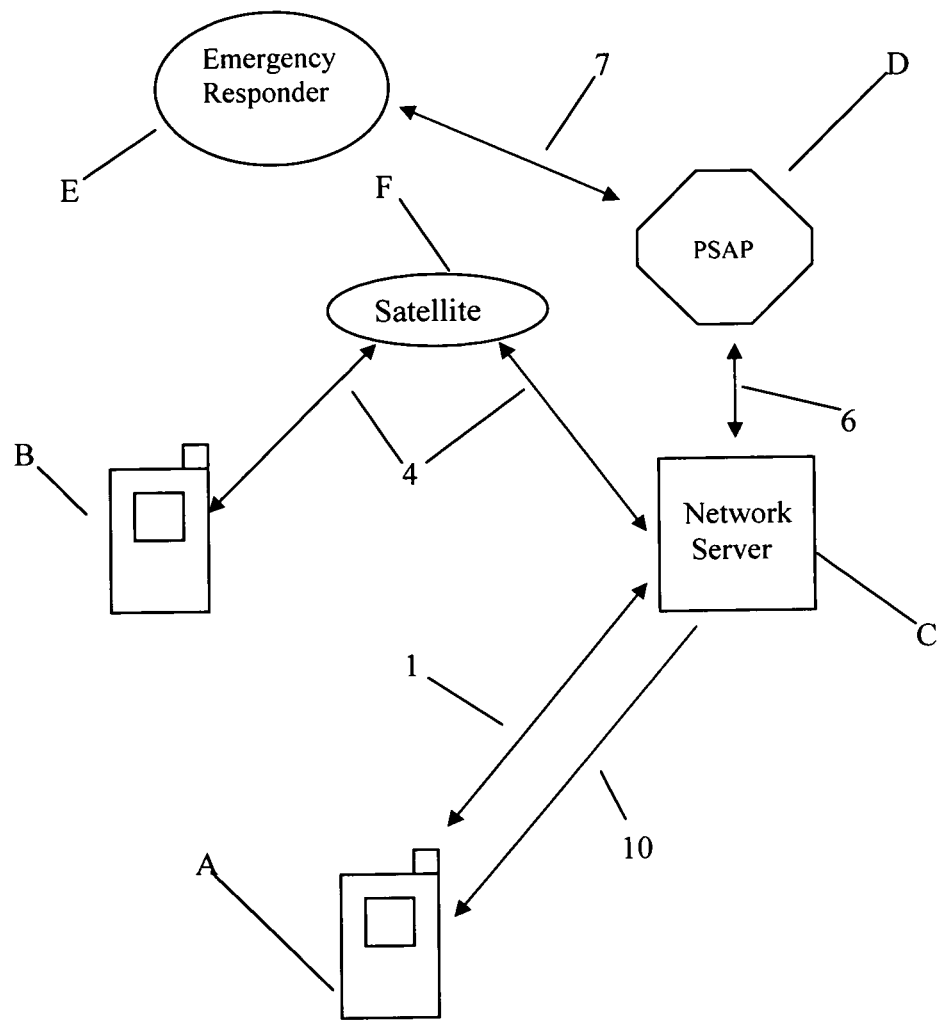
FIG. 4 is a schematic representation of a satellite event notification embodiment of the invention.
Figure 5:
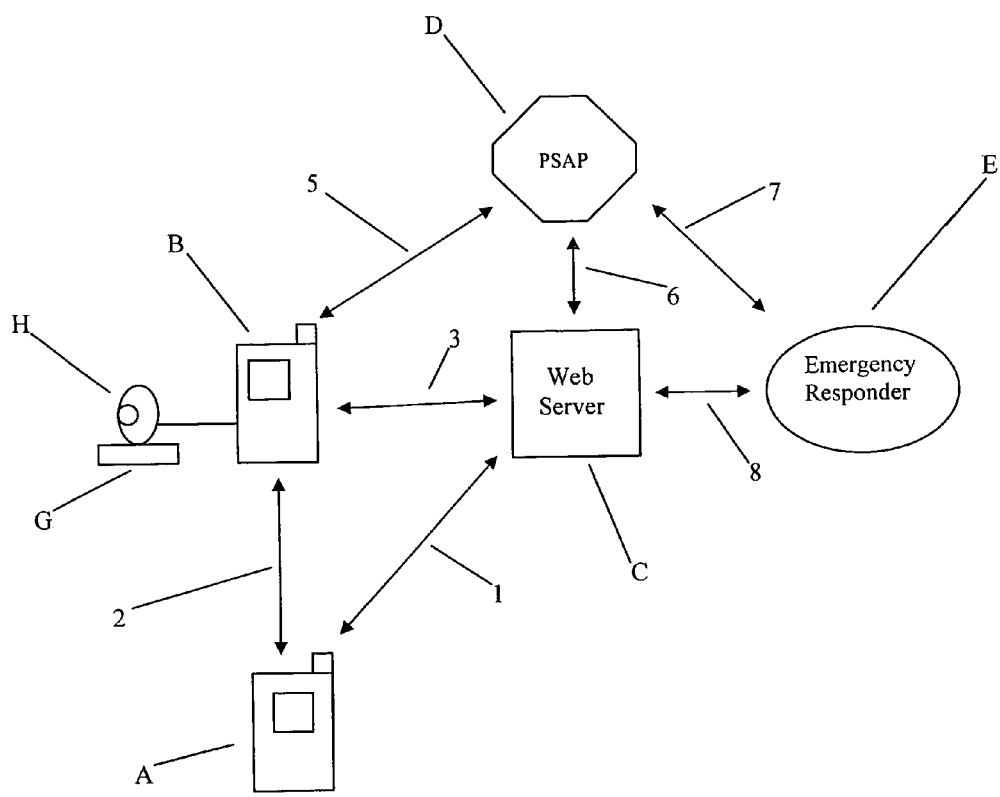
FIG. 5 is a schematic representation of a video telephone security alarm system embodiment of the invention.
Figure 6:
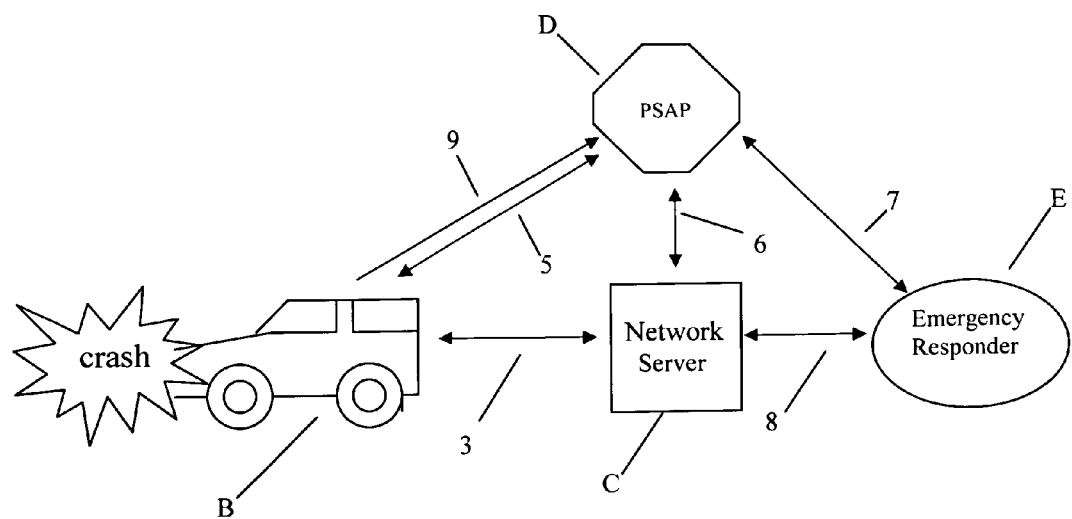
FIG. 6 is a schematic representation of a SMS, MMS automatic crash notification embodiment of the invention.
Figure 7:
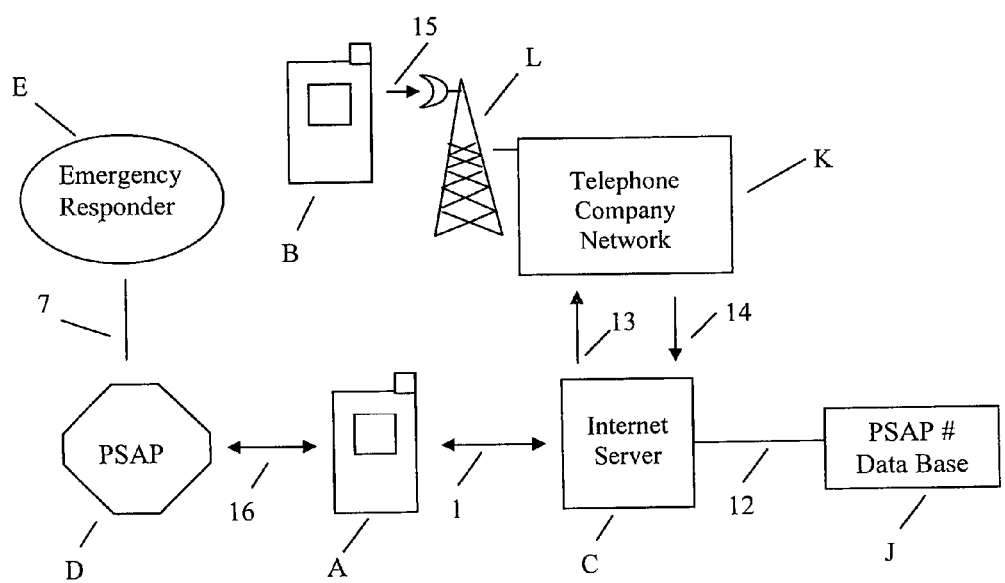
FIG. 7 is a schematic representation of a PSAP data phone number embodiment of the invention.

A Is a remote person
B Is a wireless telephone type communications device
C Denotes a network server or Internet web page server
D Denotes a PSAP call center
E Denoted auxiliary emergency services personnel
F Denotes a satellite communications system network
G Denotes event detector sensor connected to a wireless telephone
H Denotes a camera connected to the wireless telephone
I Denotes medical event sensors
J Denotes a data base of PSAP jurisdiction boundaries and telephone numbers
K Denotes a telephone company network
L Denotes a telephone company cell tower

Reference Numbers

1 A network data connection between person A and server C
2 A voice call connection between person A and wireless telephone B
3 A network data connection between wireless telephone B and network server C
4 A wireless telephone to satellite F and satellite to network server C data connection
5 A voice call connection between wireless telephone B and PSAP D
6 A data connection between PSAP D and network server C
7 A voice connection between PSAP D and emergency responders E
8 A data connection between emergency responder E and network server C
9 An SMS or MMS transmission to a PSAP from a wireless telephone in a vehicle
10 An SMS or MMS event notification transmission from a server C to a person
11 A radio frequency connection such as Bluetooth
12 A communication connection between a server C and a PSAP telephone number data base J
13 A location query connection between server C and telephone company network K
14 A location update between telephone company network K and server C
15 A cellular connection between wireless communication device B and a telephone company network cell tower L
16 A voice call connection between a person A and a PSAP D

EXPLANATION OF DRAWINGS

Drawing 1
Personal Safety Wireless Telephone Embodiment

A person, parent, guardian or supervisor A logs-onto a network server C via data connection 1 and causes the server to send a data command 3 to wireless telephone B instructing it to begin transmitting GPS location information to server C and to also establish a voice telephone call connection 2 with remote person A.

The remote person A sends a command 2 to the wireless telephone during this first telephone call connection ordering it to establish a second telephone call connection 5 with D a PSAP call center (911 in the US, 112 in Europe).

When the PSAP answers the second telephone call 5 from the wireless telephone B the wireless telephone adds the first call from the remote person 2 to the second PSAP call 5 and establishes a 3-way multiparty conference call connection including the remote person A, the PSAP D and wireless telephone B while maintaining the separate IP data connection 3 with the network server C.

The remote person A is then able to tell the PSAP call taker D the reason for the call and to also provide to the PSAP call taker the IP address and the log-on information needed for the PSAP to access the data being transmitted to the web server C by the wireless telephone B. This log-on information allowing the PSAP or dispatched emergency responders to connect with the web server 6/8 using any Internet computer and access the location data 3 that the wireless telephone is transmitting to the server C.

If the PSAP makes a determination that police assistance is required (for example to locate a lost child) The PSAP can dispatch a patrol officer E and furnish the log-on information for the server C to this emergency responder E so that he/she can independently access the server 8 using any Internet capable computer or browser equipped cell phone and view the data transmitted to the server by the wireless telephone B including mapped location information generated by server C showing the real time location of the wireless telephone B and vector in on this location to rescue the lost child or distressed person.

If desired, a medical event sensor I can also be connected to the wireless telephone by a rf connection 11 such as, but not limited to, Bluetooth allowing predefined medical events to cause an event notification to be transmitted by wireless telephone B to a person A who can then order establishment of a multiparty call to PSAP D and request emergency services for the distressed person.

Drawing Number 2.

Asset Tracking and Recovery Embodiment:

A remote person, or Call Center A places a telephone call to a wireless telephone type communications device imbedded in a mobile object B or answers a call from the Imbedded communications device thereby establishing a first telephone call connection between the telephone operated by the remote person and the communications device imbedded in the mobile asset.

The remote person sends a DTMF command to the imbedded communications device B during the first telephone call connection 2 ordering it to establish a concurrent, but separate, TCP/IP data connection 4 with an internet web server C and transmit to the web server its GPS location and to also establish a second telephone call connection 5 with a PSAP call center D (911 in the US or 112 in Europe).

When the PSAP answers the second telephone call from the imbedded communications device 5 the imbedded communications device adds the first call from the remote person 2 to the second PSAP call 5 and establishes a 3-way multiparty conference call connection including the remote person, the PSAP and the imbedded communications device while maintaining the separate IP data connection 3 with the web server.

The remote person is then able to tell the PSAP call taker the reason for the call and to also provide to the PSAP call taker the IP address and the log-on information needed for the PSAP to access the data being transmitted to the server C by the imbedded communications device. This log-on information allows the PSAP to connect with the web server 6 and access the data, including location information that the communications device is transmitting to the web server.

If the PSAP makes a determination that police assistance is required (for example to recover a stolen asset) The PSAP can dispatch a patrol officer or other emergency responder E and also furnish the IP address and log-on information for the web server to this emergency responder so that he/she can independently access the web server 8, view the data transmitted to the server, including mapped location generated by the server of the real time location of the asset, and vector in on this location.

Drawing Number 3.

Automatic Crash Notification Embodiment:

A mobile object with an imbedded wireless telephone type communications device is involved in an accident. Accident detection sensors connected to the imbedded communications device B detect the accident and causes a TCP/IP Internet data connection 3 with network server C to be established and for accident data including location of the mobile object and also audio and video information showing the injury level of the occupants of the mobile object to be transmitted from the wireless telephone to the server.

The imbedded communications device also establishes a concurrent, but separate, telephone call 5 to a PSAP D and provides the PSAP with the IP address and log-on information needed by the PSAP to log-on to the web server C via IP connection 6 thereby gaining access to the accident data transmitted to the server by the imbedded wireless telephone type communications device.

The PSAP call taker is able to talk to the accident victims via the telephone connection 5 and to also access video image information captured by a camera connected to the imbedded wireless telephone and showing the injury level of the occupants of the mobile and to also access data related to the forces involved in the accident such as speed of impact, Delta-V, number of impacts, etc.

The PSAP call taker upon reaching a determination that emergency services are required, can dispatch 7 emergency responders E and provide these dispatched emergency responders with the IP address and log-on information needed for them to independently log-onto the server and access the accident information 3 transmitted to the server by the wireless telephone B.

The web server further enables 2-way audio communications to be established between the emergency responders and the occupants of the mobile object through a call bridge 8/3 set up by the server C.

Maps showing the location of the mobile object and video images showing the injury level of the occupants can also be viewed on the web site server by the emergency responders. A data base of user related information such as medical history and emergency contact numbers as well as accident related data such as speed of collision, number of occupants, whether they were belted or unbelted, number of impact G-forces, number of impact impulses and Delta-v impact values can also be accessed by the emergency responders.

Drawing 4.

Satellite Event Notification Embodiment:

A satellite telephone B transmits an event notification 4 to a satellite F that retransmits it to a network server C. Network server C sends a designated person A an SMS, MMS or e-mail notification 10 of reception of the event notification and the person A connects 1 to the server C by an Internet computer or a browser capable cell phone and accesses the data transmitted to the server 4 by the satellite telephone B via satellite relay F. Upon reaching a determination that emergency services are required the person commands the server C to establish a call connection 6 with the 10-digit telephone number that the server data base determines is the PSAP with jurisdiction over the location of the satellite telephone. The server C then places a call to this telephone number and when the PSAP answers this call the server joins the two calls by bridging the PSAP connection 6 to the connection with the person 1. The person is then able to talk to the PSAP via the server enabled call bridge; explain the problem to the PSAP call taker and provide the log-on information needed by the PSAP D to log-onto the server.

After reaching a determination that emergency services are required the PSAP can dispatch 7 emergency responders E and provide them with log-on information for server C allowing then to access the location information being sent from the satellite telephone to the server C via the satellite F. If the person desires to call the PSAP directly from his personal telephone rather than have the server establish a bridged call he can do so by dialing the 10-digit number provided by the server data base of PSAP numbers.

Drawing 5.

Video Telephone Security Alarm System Embodiment:

A security camera H connected to an event detection sensor G detects a predefined alarm event or condition at a location being protected. It causes a dual-mode wireless/wire line telephone type security device B to transmit an alarm notification 2 to a person A and to also begin transmitting event data 3 including video information captured by the camera to a network server C.

Person A upon reception of the alarm notification—which can be an SMS, MMS, an e-mail or an incoming call—establishes a telephone call connection 2 with the telephone type security device and upon reaching a determination that police assistance is required sends it a command to establish a 3-way multiparty call 2/5 with a PSAP D. Said multiparty call including the person A, the telephone B and the PSAP D.

Person A explains to the PSAP the reason for the call and provides the IP address or Domain name and pass-code required to log-onto the server C and gain access to data transmitted to the server by the telephone type security device B and connected camera F. The PSAP can provide dispatched emergency personal E with the log-on information for server C thereby providing a means whereby they can log-onto the server during the person to PSAP call or after termination of the multiparty call connection. The server is programmed to allow access to any person in possession of the log-on information for a predetermined time after termination of the multiparty call and allow them to view data from camera H.

The person to telephone type security device call connection can be voice only or it can be voice and video (from the camera connected to the security device) using 3G IMS/SIP video share protocols such as are currently supported by AT&T in the U.S. The PSAP can also be connected during the multiparty call as either a voice only or a video share connection with camera H captured video information sent to the PSAP depending on how the telephone type security device was configured at installation.

Drawing 6.

UK SMS, MMS Automatic Crash Notification Embodiment:

A mobile object B with an imbedded wireless telephone type communications device is involved in an accident. Accident detection sensors connected to the imbedded wireless telephone type communications device detect the accident and causes a TCP/IP Internet data connection 3 with network server C to be established and for accident data including location of the mobile object and also audio and video information showing the injury level of the occupants of the mobile object to be transmitted from the wireless telephone to network server C. The wireless telephone also Transmits an SMS or MMS message 9 to the PSAP D with accident location information and log-on information for network server C included in the SMS message. If an MMS message is transmitted instead of an SMS then audio and video information captured by Connected audio microphones and a video camera can be included in the MMS message allowing the PSAP dispatcher to see the injury level of the vehicle occupants. The video information can be in snapshot, JPEG or streaming video format.

The PSAP can dispatch emergency responders E and provide them with the log-on Information for network server C. The responders E can log-on 8 and view location and video information and also establish an audio communications connection bridge 8/3 to be set up by the server allowing the responders to talk with the accident victims.

Drawing 7.

PSAP Data Base Provided Telephone Number Embodiment:

A person A accesses an Internet server C via data connection 1 and causes the server to send a location update request 13 to telephone company network K. Telephone company network K transmits the requested location update 14 to internet server C.

Person A requests server C to access a PSAP jurisdiction boundary and telephone number data base J to determine the telephone number of a PSAP D with jurisdiction over the wireless communication device B.

Person A uses the data base determined PSAP telephone number to establishes a telephone call connection 16 with PSAP D to request emergency services at the location of wireless communication device B. PSAP D dispatches 7 emergency responder E to provide emergency services at the location of wireless communication device B.

SUMMARY, RAMIFICATIONS, AND SCOPE

While the present invention has been shown and described with reference to particular embodiments it will be understood by those skilled in the art that various changes may be made and equivalents substituted without departing from the broad scope of the invention. In addition, many modifications may be made to adapt a particular situation to the teachings of the invention without departing from the essential scope thereof. Therefore, it is intended that the invention not be limited to the particular embodiments disclosed herein, but that the invention will include all embodiments falling within the scope of the appended claims. Thus the scope of the Invention should be determined by the appended claims and their legal equivalents, rather than by the examples given.

What is claimed is:

1. A method providing a means whereby an Internet server with access to a satellite communication device via a satellite communication network can determine the GPS latitude and longitude location of said satellite communication device and use said GPS latitude and longitude location to query a data base of PSAP jurisdiction boundaries and telephone numbers to determine a telephone number of a PSAP to call to request emergency services at the location of said satellite communication device, comprising:

a. a person accessing an Internet server configured to track and map the location of a satellite communication device via a satellite communication network;

b. said person requesting the current location of said satellite communication device;

c. said Internet server transmitting a location query to said satellite communication device via said satellite communication network;

d. said satellite communication device answering said location query by transmitting its GPS latitude and longitude location to said Internet server and said Internet server publishing said GPS location in map format for viewing by said person;

e. said person viewing said mapped location information, reaching a determination that emergency services are needed at the location of said satellite communication device and requesting the Internet server to determine a PSAP telephone number to call to request said emergency services;

f. said Internet server accessing a data base of PSAP jurisdiction boundaries and telephone numbers, inputting the GPS latitude and longitude location of said satellite communication device; said data base determining the telephone number of a PSAP having jurisdiction over said GPS latitude and longitude location and said Internet server publishing said PSAP telephone number for viewing by said person;

g. said person calling said data base provided PSAP number, establishing a call connection with a PSAP call taker, explaining the nature of the emergency and requesting emergency services at the location of said satellite communication device.

2. The method according to claim 1 wherein the data base of PSAP jurisdiction boundaries and telephone numbers resides on the Internet server.

3. The method according to claim 1 wherein the data base of PSAP jurisdiction boundaries and telephone numbers resides on the satellite communication network.

4. The method according to claim 1 wherein the data base of PSAP jurisdiction boundaries and telephone numbers resides on a $3^{rd}$ party server which the Internet server is authorized to access.

5. A method providing a means whereby a person can access an Internet server with access to a data base of PSAP (Public Safety Answering Point) telephone numbers and jurisdiction boundaries to determining a PSAP telephone number to call to request emergency services at the location of a remote WCD (wireless communication device), comprising:

a. a WCD transmitting a text message with GPS location information to a wireless telephone or computer of a person;

b. said text message configured as a clickable link to an Internet server configured to display the GPS location of said WCD in map format;

c. said Internet server having access to a data base of PSAP telephone numbers linked to PSAP jurisdiction boundaries;

d. said person clicking said text message clickable link and viewing said mapped location of said WCD on said Internet server;

e. said person reaching a determination that emergency services are needed at the location of said WCD;

f. said person ordering said Internet server to access a data base of PSAP telephone numbers linked to PSAP jurisdiction boundaries to determine a telephone number of a PSAP having jurisdiction over the location of said WCD;

g. said Internet server publishing said data base provided PSAP telephone number for viewing by said person, and h. said person calling said data base provided PSAP telephone number, establishing a call connection with a PSAP call taker, explaining the nature of the emergency and requesting emergency services at the location of said WCD.

6. The method according to claim 5 wherein the PSAP telephone number is a 10-digit telephone number.

7. The method according to claim 5 wherein the PSAP telephone number is a VoIP (Voice Over Internet Protocol) Internet address or call routing number.

8. The method according to claim 5 wherein the text message transmitted by the WCD to the communication device of the person is transmitted upon detection of a predefined event.

9. The method according to claim 5 wherein the text message transmitted by the WCD to the communication device of the person is transmitted upon reception of a location query from said person.

10. The method according to claim 5 wherein the data base of PSAP jurisdiction boundaries and telephone numbers resides on the Internet server.

11. The method according to claim 5 wherein the data base of PSAP jurisdiction boundaries and telephone numbers resides on a $2^{nd}$ party server which the Internet server is authorized to access.

12. The method according to claim 5 wherein the communication device of the person receiving the message transmitted from the WCD is a cellular telephone, a VoIP telephone or a computer with Internet access.

13. The method according to claim 5 wherein the WCD that transmits the text message to the communication device of the person is a cellular telephone.

14. The method according to claim 5 wherein the WCD that transmits the text message to the communication device of the person is a Satellite communications device.

15. The method according to claim 5 wherein the WCD that transmits the text message to the communication device of the person is a cellular or Satellite locator device attached to or carried in a vehicle or a mobile asset.

16. The method according to claim 5 wherein the WCD that transmits the text message to the communication device of the person is a cellular locator device attached to or carried by a developmental disabled child or Alzheimer patient.

17. The method according to claim 5 wherein the WCD that transmits the message to the communication device of the person is part of an alarm system protecting a fixed location or mobile asset.

18. The method according to claim 17 wherein the alarm system is connected to a camera configured to capture image information related to alarm events and transmit said image information to the communication device of the remote person.

19. A method providing a means whereby an Internet server can determine the location of a WCD (Wireless Communications Device) using telephone company provided location information and access a data base of PSAP (Public Safety Answering Point) telephone numbers and jurisdiction boundaries to determine a PSAP telephone number to call to request emergency services at the location of said WCD, comprising:

a. a person accessing an Internet server configured to track and map the location of a WCD using telephone company provided location information;

b. said person requesting a location update for a specific WCD;

c. said Internet server accessing a data base of telephone company provided WCD location information to obtain said location update;

d. said Internet server publishing said WCD location update for viewing by said person;

e. said person transmitting a command to said Internet sever instructing said Internet server to access a data base of PSAP jurisdiction boundaries and telephone numbers to obtain the telephone number of a PSAP having jurisdiction over the updated location of said WCD;

f. said server publishing said data base provided PSAP telephone number for viewing by said person, and g. said person calling said data base provided PSAP telephone number and requesting emergency services at the location of said WCD.

20. The method according to claim 19 wherein the data base provided PSAP telephone number is a 10-digit telephone number.

21. The method according to claim 19 wherein the data base provided PSAP telephone number is a VoIP (Voice over Internet Protocol) Internet address or call routing number.

22. The method according to claim 19 wherein the data base of PSAP jurisdiction boundaries and telephone numbers resides on the Internet server.

23. The method according to claim 19 wherein the data base of PSAP jurisdiction boundaries and telephone numbers resides on a $2^{nd}$ party server which the Internet server is authorized to access.

24. The method according to claim 19 wherein the WCD is a cellular telephone carried by a person.

25. The method according to claim 19 wherein the WCD is a cellular telephone locator device attached to or carried by a developmental disabled child or Alzheimer patient.

26. The method according to claim 19 wherein the WCD is a cellular telephone locator device attached to or carried in a vehicle or a mobile asset.

27. A method providing a means whereby a person can call a Call Center with access to a data base of PSAP jurisdiction boundaries and telephone numbers, provide the call taker with the GPS location of a WCD (Wireless Communication Device) and obtain the telephone number of a PSAP (Public Safety Access Point) with jurisdiction over the GPS location provided to said Call Center call taker by said person, comprising:

a. A person calling a Call Center with access to a data base of PSAP telephone numbers and jurisdiction boundaries;

b. said person providing the GPS location of a WCD to a Call Center call taker;

c. said call taker accessing a data base of PSAP jurisdiction boundaries and telephone numbers and inputting said WCD GPS location provided by said person;

d. said data base providing said call taker with the telephone number of a PSAP having jurisdiction over the WCD GPS location provided by said person;

e. said Call Center call taker providing the data base provided PSAP telephone number to said person, and f. said person calling said PSAP telephone number provided by said Call Center call taker, establishing a call connection with a PSAP call taker and requesting emergency services at the location of said WCD.

28. The method according to claim 27 wherein the data base provided PSAP telephone number is a 10-digit telephone number.

29. The method according to claim 27 wherein the data base provided PSAP telephone number is a VoIP (Voice over Internet Protocol) address or call routing number.

30. The method according to claim 27 wherein the WCD is a cellular telephone or locator device.

31. The method according to claim 27 wherein the WCD is a Satellite communications device.

\* \* \* \* \*